United States Patent [19]

Paar et al.

[11] Patent Number: 4,568,709

[45] Date of Patent: Feb. 4, 1986

[54] CATHODICALLY DEPOSITABLE ELECTRODEPOSITION PAINT BINDERS BASED ON REACTION PRODUCTS OF EPOXY RESIN-AMINO ADDUCT WITH FORMALDEHYDE AND PHENOLS

[75] Inventors: Willibald Paar; Johann Gmoser; Helmut Hönig; Wolfgang Daimer, all of Graz, Austria

[73] Assignee: Vianova Kunstharz, A.G., Werndorf, Austria

[21] Appl. No.: 712,515

[22] Filed: Mar. 18, 1985

[30] Foreign Application Priority Data

| Mar. 16, 1984 [AT] | Austria | 884/84 |
| Jul. 12, 1984 [AT] | Austria | 2243/84 |
| Aug. 6, 1984 [AT] | Austria | 2526/84 |
| Nov. 15, 1984 [AT] | Austria | 3608/84 |

[51] Int. Cl.$^4$ .................. C08G 18/80; C08G 59/14; C09D 3/58; C09D 5/44
[52] U.S. Cl. ................... 523/414; 523/416; 523/417; 524/901
[58] Field of Search ............ 523/414, 416, 417; 524/901

[56] References Cited

U.S. PATENT DOCUMENTS

| Re. 31,616 | 6/1984 | Tsou ................................ 523/414 |
| 4,172,193 | 10/1979 | Marx et al. ..................... 524/901 |
| 4,197,224 | 4/1980 | Schmölzer et al. ............ 524/901 |
| 4,278,579 | 7/1981 | Murphy .......................... 524/901 |
| 4,278,580 | 7/1981 | Schmölzer et al. ............ 524/901 |

*Primary Examiner*—Ronald W. Griffin
*Attorney, Agent, or Firm*—A. W. Breiner

[57] ABSTRACT

Cathodically depositable electrodeposition paint binders comprising the reaction product of an epoxy resin with at least two epoxy groups with amines carrying primary amino groups and, optionally, with a carboxylic acid compound to provide an epoxy resin-amino adduct which is then reacted with a phenol and formaldehyde. The binders have excellent corrosion resistance and crosslink to provide coating films at relatively low stoving temperatures without splitting off of substances harmful to the environment.

27 Claims, No Drawings

CATHODICALLY DEPOSITABLE ELECTRODEPOSITION PAINT BINDERS BASED ON REACTION PRODUCTS OF EPOXY RESIN-AMINO ADDUCT WITH FORMALDEHYDE AND PHENOLS

FIELD OF INVENTION

The present invention relates to cathodically depositable electrodeposition paint binders which are self-crosslinking and which are based on reaction products of epoxy resin-amino adducts with formaldehyde and phenols.

BACKGROUND OF INVENTION

Cathodically depositable paint binders based on the reaction products of Mannich-bases and epoxy resins are disclosed in many references. Thus, according to DE-OSS Nos. 20 33 770; 23 20 301; 23 57 045; 24 19 179; 25 41 801; 25 54 080; 27 11 385, and 30 45 251, Mannich-bases obtained from polyvalent phenols, secondary amines, and formaldehyde are reacted with epoxy resins, the phenols as well as the epoxy resins being subject to a variety of modifications, for example with semi-blocked diisocyanates, other phenols, or metal salts. As disclosed in the aforementioned references, binders of this type require stoving temperatures of around 190° C. for crosslinking, which nevertheless leads to films having salt spray resistance which is too low for most practical applications. Furthermore, the products crosslink through a splitting off of formaldehyde and amines, causing pollution problems. A substantial part of the development and improvement efforts set forth in the noted patents are, therefore, not directed to enhancing the film properties, but rather are directed to efforts to reduce the polution problem due to the splitting off of substances harmful to the environment. As disclosed in DE-OS No. 25 54 080, for example, in the case of a modification with semi-blocked diisocyanates, the isocyanate groups contribute very little from the standpoint of improving the films but serve primarily to tie up the amines set free on stoving.

PCT Publication No. WO 83/00872 discloses cathodically depositable electrodeposition paint binders which are obtained through co-condensation of partially reacted epoxy resins and phenol resols, and simultaneous or subsequent reaction of the epoxy groups with primary or secondary amines. An essential disadvantage in the manufacture of such products is the necessity of preparing the phenol resols, which, as is known, requires considerable time and produces relatively large quantities of waste water containing phenol and salts. Remnants of salts remaining in the resin may, furthermore, lead to problems on electrodeposition.

OBJECTS AND GENERAL DESCRIPTION OF INVENTION

It has now been found that cathodically depositable electrodeposition paint binders providing a high degree of corrosion protection at stoving temperatures of from 150°–160° C. can be produced in a simple manner by condensing in one reaction step epoxy resin-amino adducts carrying secondary amino groups with formaldehyde, or with a substance which splits off formaldehyde under the reaction conditions, and with phenols. The phenols may be substituted in part with formaldehyde-reactive amino compounds or amino-alkylation products of monosubstituted phenols.

The present invention, therefore, is directed to a process for producing cathodically depositable electrodeposition paint binders based on modified epoxy resins characterized in that an epoxy resin with at least two epoxy groups and an epoxy equivalent weight of 180 to 1000 is reacted at from about 50° to 120° C. with—

0.6 to 1.0 moles of primary amino groups per each available epoxy group, the primary amino group being from a primary monoalkyl amine and/or a primary alkylene diamine and/or a primary-tertiary alkylene diamine, and 0 to 0.4 moles of a carboxylic compound or a secondary amine per available epoxy group to provide an epoxy resin-amino adduct having an epoxy value of practically zero, the resulting epoxy resin-amino adduct then being reacted at from about 50° to 90° C., calculated on one mole of NH-groups, with 0.5 to 1.0 moles of a mono- or polynuclear phenol and/or alkyl phenol and/or aminoalkylation product of a monosubstituted mono- or dinuclear phenol, or, optionally, substituted in part with a formaldehyde-reactive compound such as urea, melamine or guanamine, and with 0.25 to 0.9, preferably 0.6 to 0.8, moles of formaldehyde per formaldehyde-reactive site, until the formaldehyde is substantially bound and the reaction product, upon partial or total neutralization with acids and, optionally after addition of water-tolerant organic solvents, is dilutable with water.

The process of the invention is characterized through a simple method of execution. A particular advantage is the total absence of unusable by-products.

The coating compositions prepared in appropriate manner from the binders produced according to the invention exhibit excellent performance on electrodeposition and outstanding stability of the bath material formed therefrom. The theoretical explanation for the improvement is the resistance to hydrolysis of the molecule formed through direct linkage between epoxy resin, amine, and phenol. The products, at stoving temperatures as low as 150° C., yield films with excellent corrosion resistance, without use of catalysts. The quantity of decomposition products split off during stoving is low, the products substantially being water and low amounts of formaldehyde.

Suitable epoxy resins for carrying out the invention are commercially available di- or polyepoxy compounds obtained through reaction of polyvalent phenols, particularly of bisphenol A, or of phenol novolaks with epichlorohydrin. Optionally, other epoxy resins, for example resins based on polyols, may be used. Products of this type are disclosed in the literature and are known to those skilled in the art. The epoxy resins preferred for the process of the invention are based on bisphenol A or on phenol novolaks with an epoxy equivalent weight of from about 180 to 1000.

In carrying out this invention, the epoxy resins, preferably in the presence of aprotic solvents, are reacted with a primary amine to give an epoxy resin-amino adduct carrying secondary amino groups. For each available epoxy group on the epoxy resin, 0.6 to 1.0 moles of primary amino groups are used, the amino groups being from primary monoalkylamines preferably having four or more carbon atoms in the alkyl radical, or primary alkylene diamines or diamines carrying a tertiary amino group besides the primary amino group, such as a dialkyl amino group. The preferred representatives of this group are n- and isobutyl amine, hexyl amines, 2-ethylhexylamine, ethylene diamine, and its homologues; and primary-tertiary diamines such as dimethylaminopropylamine, diethylaminopropylamine, and the homologues of this series. Mixtures of alkylamines and alkylenediamines are particularly preferred. The reaction is carried out at from about 50° to 90° C.

The aprotic solvents useful in various cases for carrying out the reaction are aromatic hydrocarbons such as toluol or xylol or glycoldiethers, such as diethyleneglycoldimethylether. The quantity of solvents which can be used range from about 10 to 50%, calculated on the epoxy resin-amino adduct.

Optionally, the epoxy resin-amino adduct may be modified with up to 40 mole-%, calculated on the available epoxy groups, with carboxylic compounds, such as the saturated or unsaturated fatty acids, carboxy group containing polyesters or corresponding pre-polymers, such as polymers based on the acrylates. The preferred fatty acids are monocarboxylic acids having from 7 to 20 carbon atoms of synthetic or natural origin. Examples are iso-octanoic acid, iso-nonanoic acid, alpha-branched synthetic monocarboxylic acids with $C_8$-$C_{12}$-alkyl radicals (KOCH-acids) or oil fatty acids and tall oil fatty acids. Other monocarboxylic compounds suitable for the modification of the epoxy resin-amino adducts are semiesters of dicarboxylic acids with monoalcohols with more than three carbon atoms, or carboxylic acids modified with oxazolidines. The preparation of the latter is disclosed in commonly assigned U.S. application Ser. No. 06/549,328 filed Nov. 7, 1983. There the oxazolidines serve as additional donator of formaldehyde. The reaction with the carboxy group containing modifiers is preferably carried out at from about 90° to 120° C. prior to the reaction with the amines.

In a special embodiment of the present invention, the carboxylic compounds coemployed with the primary amino compound and which can be used to particular advantage are adducts of maleic acid anhydride to unsaturated oils and/or unsaturated hydrocarbon compounds, the anhydride groups of which have been opened through formation of semiesters with monohydroxy compounds, the free carboxy groups being optionally partially reacted with monoepoxy compounds. Through this modification the film surface and the flexibility of the films can be essentially improved. The maleic acid anhydride adducts suitable for the modification of the epoxy resin-amino adduct are formed in known manner through addition of maleic anhydride to unsaturated oils such as tung oil, linseed oil, dehydrated castor oil, soya oil, sunflower oil, and similar natural oils. Synthetic hydroxy-free esters of the fatty acids contained in the aforementioned oils and of tall oil fatty acids with polyols also are suitable starting materials. The preferred polyene compounds for reaction with maleic anhydride are unsaturated low-molecular hydrocarbon polymers or oligomers. Examples of this class of compounds are the so-called polybutadiene oils, i.e., liquid oligomers of butadiene with various stereospecific structures, or the corresponding pentadienes or cyclopentadienes. These compounds normally have molecular weights of between 400 and 3000. It is evident that blends of these starting materials can be used in the adduct formation with maleic anhydride. The quantity of maleic anhydride is chosen in order that the carboxylic compound has an acid value of from about 30 to 130 mg KOH/g, preferably from about 35 to 80 mg KOH/g. For semiester formation, the maleic anhydride adducts are reacted with the monohydroxy compounds in known manner at from about 50° to 150° C. Suitable monohydroxy compounds are the saturated or unsaturated monoalcohols with from 1 to 18 carbon atoms, such as methanol and its homologues, fat alcohols, allyl alcohol, etc. Other suitable monohydroxy compounds are glycol monoesters of (meth)acrylic acid, such as hydroxyethyl(meth)acrylate, hydroxypropyl(meth)acrylate, and the further homologue and isomeric compounds. When using unsaturated monohydroxy compounds, it is advantageous to carry out the reaction in the presence of inhibitors, such as hydroquinone. The number of carboxy groups on the semiesters can be reduced by the reaction of such groups with monoepoxy compounds, such as esters of epoxidized fatty acids or glycidyl esters or ethers. Examples of compounds suitable for this purpose are glycidyl esters of KOCH-acids, defined above, particularly those carrying at the tertiary carbon atom at least one fatty acid radical with more than eight carbon atoms. The reaction of this group of carboxylic compounds with the epoxy groups of the epoxy resin is carried out at from about 90° to 150° C. It is of advantage to carry the reaction to the complete linking of the modifying compound.

Suitable further modifiers are secondary amines, particularly secondary alkyl amines. The tertiary amino groups resulting can influence the solubility of the products.

The reaction step leading to the epoxy resin-amino adduct is carried to an epoxy value of practically zero, i.e., the obtained epoxy resin-amino adducts are free from epoxy groups.

The resulting epoxy resin-amino adduct, optionally modified with carboxylic compounds, is reacted with formaldehyde or a compound which will split off formaldehyde under the reaction conditions along with a mono- or polynuclear phenol and/or alkyl phenol and/or an amino-alkylation product of monosubstituted mono- or divalent phenols or, optionally, substituted in part with a formaldehyde-reactive compound of the urea, melamine, or guanamine type. According to the invention, for each mole of NH-groups in the epoxy resin-amino adduct, 0.5 to 1.0 moles of phenol and, for each formaldehyde-reactive site, 0.25 to 0.9 moles of formaldehyde are reacted. The reaction is carried out at from about 50° to 90° C., and is preferably carried out to obtain substantially complete linking of the formaldehyde.

Phenol, as the phenolic component, is used in the forms commonly found on the market, such as 90% liquid phenol or alkyl phenols such as the methyl, butyl, or higher phenols such as nonyl phenols or diphenols of the formula Ph—R—Ph, wherein R is a straight chain or branched alkylene radical with from 1 to 5 carbon atoms and where Ph is a phenol moiety, preferably bisphenol A. The phenols have to have at least two formaldehyde-reactive sites to achieve the desired properties.

In an alternative of the process which permits the reduction of the quantity of acid necessary for achieving adequate water solubility, the phenol component of this invention can be totally or partly an amino-alkylation product of mono-substituted mono- or dinuclear phenols, the substituent being an alkyl radical with at least four carbon atoms or an aralkyl radical, and the amine has at least two amino-hydrogen atoms and at least four carbon atoms. As a result of these structures, besides improved solubility, additional flexibilizing and flow-out enhancing groups are introduced into the binder molecule. Accordingly, the coemployment of high boiling solvents in the paint formulation is eliminated, or the solvents are necessary in only low levels. The amino-alkylation phenol products used in this embodiment are formed in the pattern of a Mannich-reaction from phenols, amines, and formaldehyde. In contrast to the cathodically depositable binders based on Mannich-bases, as disclosed in the prior art, the Mannich-reaction in this case is only an additional modification of the phenolic component. As a result of using the primary and higher molecular amines, the quantity of decomposition products forming on stoving is increased through this modification in subordinate rate only.

For the preparation of the amino-alkylation phenol intermediates used according to the invention, the suitable monosubstituted mononuclear phenols are, in the first place, alkyl phenols, the alkyl radical of which carries at least four carbon atoms. Representatives of this group are butyl phenols and their higher homologues, preferably those with eight and more carbon atoms in the substituent, such as p-isooctylphenol or p-nonylphenol. Other suitable substituents are aralkyl radicals of the type present in benzyl phenol or cumyl phenol. In the group of dinuclear phenols bis-hydroxyarylalkanes, such as bis-(4-hydroxyphenyl)methane or, preferably, 2,2-bis-(4-hydroxyphenyl)propane (bisphenol A) are illustrative examples.

Suitable amines for use in forming the intermediate components are those carrying in the molecule at least two amino-hydrogen atoms and having at least four carbon atoms. Among these compounds are primary (alkanol)amines, such as the butyl amines, their higher homologues, such as ethylhexylamine, the corresponding alkanol amines, the corresponding primary diamines, such as hexamethylene diamine, or primary-tertiary diamines, such as N,N-diethylaminopropylamine. Suitable amines may also be formed through reaction of primary diamines (1 mole) with acrylic esters or monoepoxy compounds (2 moles). Particularly suitable compounds are reaction products of hexamethylene diamine with butyl acrylate and 2-ethylhexylacrylate or with glycidyl esters of KOCH-acids as above defined.

The amino-alkylation phenol intermediate components suitable for the process of the present invention are prepared in order that the amines are heated together with the phenols to 70° to 80° C. After addition of formaldehyde, preferably as paraformaldehyde, the reaction is carried on at 80° to 130° C., the reaction water being eliminated with the aid of an entraining agent. Depending on the type of the reactants, the reaction may become less or more exothermic on the addition of formaldehyde. The reaction is finished when one mole of reaction water has been entrained for each mole of phenol used.

Products with substantially equal properties are obtained in an alternative method whereby the amino-alkylation of the phenols is carried out in the presence of the epoxy resin-amino adduct. This alternative allows the production of the products of the invention in a "one-reactor process." After producing the epoxy resin-amino adduct, the amine provided for alkylation, the phenol, and the formaldehyde are added and condensed for one to three hours at 70° to 90° C. The reaction water forming remains in the reactor. After this reaction time, the selected quantities of phenol and formaldehyde are added, and the reaction is carried out at from about 55° to 80° C. to a formaldehyde content of below 0.5% (Alternative B hereinafter).

In a further alternative (Alternative C hereinafter), it is possible to combine both reaction steps. In this method the epoxy resin-amino adduct is jointly mixed with the amine component and the total quantity of phenol and the total quantity of formaldehyde, and the reaction is carried out at 60° to 75° C. until the formaldehyde has reacted.

Optionally, the mono- or polyvalent phenol and/or alkyl phenol used according to this invention may be partly replaced by other formaldehyde-reactive compounds. Thus, the phenols can be partly replaced by amino compounds of the urea, thiourea, melamine or guanamine type, imparting a further improvement of the solubility characteristics. This latter alternative is characterized in that 0.1 to 0.4 moles of the phenolic compound are replaced by formaldehyde-reactive amino compounds of the urea, thiourea, imidourea, melamine, acetoguanamine type, or mixtures of such compounds, and are reacted in a joint reaction step with the secondary amino group containing amino compound and formaldehyde. By this measure not only are the solubility characteristics improved, but also the adhesion of the deposited film to the substrate as well as to the following coat is enhanced. The group of formaldehyde-reactive compounds useful in the present invention in particular embraces compounds of the urea, thiourea, iminourea, melamine, aceto- and benzoguanamine type, or mixtures of these compounds. The phenolic compounds can be replaced by the mentioned amino compounds at a level of from 0.1 to 0.4 moles of the phenols.

Formaldehyde, as above noted, is preferably used as paraformaldehyde in one of the marketed forms, with a content of formaldehyde of from 80 to 100%. In addition, compounds can be used as formaldehyde donators which split off formaldehyde under the reaction conditions. Such compounds include oxazolidine compounds which are used in the form of their carboxylic derivatives or as amines to modify the epoxy resin. Formaldehyde is used in a molar quantity corresponding to 25 to 90, preferably 30 to 80 mole-% or, in the particularly preferred embodiment, in a quantity of from 60 to 80 mole-%, calculated on the formaldehyde-reactive sites of the phenolic component. In order to obtain a self-crosslinking structure, it is of advantage to employ a molar excess of at least 30% of formaldehyde over the NH-groups.

In order to achieve water solubility, the basic groups of the reaction product are partially or totally neutralized with acids, preferably formic acid, acetic acid, or lactic acid. For dilutability as used in practice, a degree of neutralization of from 10 to 40% of the basic groups is sufficient, corresponding to a quantity of about 20 to 60 milliMoles of acid for 100 g of resin solids. The binders are then diluted with deionized water to the desired concentration; optionally, prior to neutralization or to dilution or in partly diluted state they are milled with pigments, extenders, and other additives to give pigmented paints.

The formulation of such paints and their application in the electrodeposition process are known to one skilled in the art and are disclosed in the literature. The deposited coatings, when used as primers, are cured at from 150° to 180° C. for ten to 30 minutes. If the binders do not contain a sufficient level of crosslinking structures, additional crosslinking components, such as blocked isocyanates or amine resins or phenolic resins, can be coemployed. With adequate formulation, the products may also be applied by other methods, such as dipping, roller coating, or spraying. Optionally, the binders may also be processed with organic solvents.

DETAILED DESCRIPTION AND EXAMPLES OF INVENTION

The following examples illustrate the invention without limiting the scope thereof. Parts and percentages refer to weight unless otherwise stated.

The following abbreviations are used in the examples:

EPH I . . . diepoxy resin based on bisphenol A, epoxy equivalent weight about 190
EPH II . . . diepoxy resin based on bisphenol A, epoxy equivalent weight about 475
EPH III . . . diepoxy resin based on polypropylene glycol, epoxy equivalent weight about 320
DEAPA . . . diethylaminopropylamine
EHA . . . 2-ethylhexylamine
NBA . . . n-butylamine
HMDA . . . hexamethylenediamine
DEA . . . diethylamine
BPA . . . bisphenol A
PH . . . phenol, 91% liquid form
NPH . . . nonylphenol
PTB . . . p-tert. butylphenol
B 180 . . . liquid polybutadiene oil (about 75% 1,4 cis-, about 24% 1,4 trans-, and about 1% vinyl-double bonds, molecular weight about 1500±15%, iodine number about 450 g/1000 g)
MAA . . . maleic acid anhydride
CE . . . technical mixture of glycidyl esters of 1,1-dimethyl-($C_7$–$C_9$)-alkane carboxylic acids
PF 91 . . . paraformaldehyde, 91%
HMDA/BUAC . . . reaction product of HMDA and n-butylacrylate (1:2 moles)
HMDA/CE . . . reaction product of HMDA and CE (1:2 moles)
EHX . . . 2-ethylhexanol
EGL . . . ethylene glycol monoethyl ether
HEGL . . . ethylene glycol monohexyl ether
DPME . . . dipropylene glycol monomethylether
PME . . . propylene glycol monomethyl ether
DEGM . . . diethylene glycol dimethyl ether
T . . . toluol
TEX . . . 2,2,4-trimethylpentane-1,3-diol-monoisobutyrate (Texanol)
Val . . . Equivalent weight in grams for the designated functional group and, accordingly, is equivalent to groups.

Examples 1-5 illustrate the reaction of the epoxy resin-amino adducts with phenols or alkylphenols.
Preparation of the Epoxy Resin-Amino Adducts A 1-A 5:

Adduct A 1:

In a reaction vessel equipped with thermometer, stirrer and reflux condenser, 190 parts (1 Val) EPH I are dissolved with 132 parts toluol and heated to 60° C. Then a blend of 59 parts DEAPA (0.45 moles) and 58 parts EHA (0.45 moles) is slowly added, the reaction temperature being held at 75°–80° C. with cooling if necessary. The temperature is held until the epoxy value has fallen to practically zero. The adduct solution which is ready for further processing contains 0.8 moles NH-groups, calculated on resin solids.

Adduct A 2:

In the manner described under Adduct A 1, a solution of 475 parts EPH II (1 Val) in 254 parts toluol is reacted with 59 parts DEAPA and 58 parts EHA (0.45 moles each). The product contains 0.8 moles NH-groups calculated on resin solids.

Adduct A 3:

In the manner described under Adduct A 1, a solution of 640 parts EPH III (2 Val) in 71 parts DEGM is reacted with 117 parts DEAPA (0.9 moles) and 66 parts NBA (0.9 moles). The product contains 1.6 moles NH-groups in 823 g of resin solids.

Adduct A 4:

In the manner described under Adduct A 1, a solution of 760 parts EPH I (4 Val) in 362 parts toluol is reacted with 260 parts DEAPA (2 moles) and 114 parts HMDA (1 mole). The product contains 4.0 moles NH-groups in 1134 g of resin solids.

Adduct A 5:

In the manner described under Adduct A 1, a solution of 190 parts EPH I (1 Val) in 47.5 parts toluol is reacted with 78 parts DEAPA (0.6 moles) and 21 parts DEA (0.3 moles), as modifier. The product contains 0.5 moles of NH-groups in 289 g of resin solids.

EXAMPLE 1

439 parts Adduct A 1 (0.8 moles NH) are heated to 60° C. and, after addition of 182 parts BPA (0.8 moles) and 75.8 parts PF 91 (2.3 moles $CH_2O$) are heated to 80° C. The temperature is held, while stirring, until a formaldehyde value of below 0.3% (calculated on the formaldehyde used) is attained. The reaction product has an amine value of 135 mg KOH/g.

EXAMPLES 2-5

The formulations, reaction conditions, and specifications are listed in Table I. The preparation is carried out as in Example 1.

TABLE I

| Example | 2 | 3 | 4 | 5 |
|---|---|---|---|---|
| Amine Adduct: | A 2 | A 3 | A 4 | A 5 |
| parts solution | 846 | 864 | 1460 | 336.5 |
| corresponding to parts resin solids containing the designated moles | 592 | 823 | 1134 | 289 |
| NH—groups | 0.8 | 1.6 | 4.0 | 0.5 |
| Phenolic Component: | BPA | BPA | PH | BPA |
| parts (100%) | 160 | 365 | 315 | 96 |
| corresponding to moles | 0.7 | 1.6 | 3.5 | 0.42 |
| moles phenol/NH | 0.88 | 1.0 | 0.88 | 0.84 |
| PF 91: | 60 | 144 | 210 | 38 |
| parts ($CH_2O$, 100%) | | | | |
| moles | 2.0 | 4.8 | 7.0 | 1.25 |
| Reaction temperature, °C. | 75 | 80 | 60 | 70 |
| Amine value, mg KOH/g | 93 | 114 | 203 | 199 |

Depending on further processing, the products of Examples 1-5 can be diluted with further auxiliary solvents such as EGL, HEGL or TEX, and can in this form or after addition of a part or the total quantity of acid necessary for protonation be used for the preparation of a milling paste.

In the production of the low solvent alternative of the binder, the selected quantity of acid is added, then deionized water is slowly stirred in until a low viscous dispersion is obtained. At 30° to 60° C., the major quantity of organic solvent is eliminated from the dispersion.

EXAMPLE 6

700 parts B 180 are reacted in the presence of 0.05 parts diphenylparaphenylene diamine (inhibitor) at 200° C., with 100 parts MAA until the MAA has reacted completely. After cooling to 100° C., 130 parts EHX are added, and the esterification is carried out at 120° C. until the MAA has reacted completely and the theoretical acid value for the semiester is reached. This product is designated herein as MAD A.

110 parts MAD A (corresponding to about 0.12 COOH-groups) are reacted with 212 parts EPH I, in an 80% solution in DEGM, at 120° C. to an acid value of practically zero. After addition of 108 parts DEGM, 59 parts DEAPA (0.45 moles) and 59 parts EHA (0.45 moles), the batch is reacted at 65° to 70° C. to an epoxy value of practically zero. Upon reaching this value, 114 parts BPA (0.5 moles) and 50 parts PF (1.5 moles) are added and the reaction is carried out at 60° C. to a content of free formaldehyde of 0.5 to 1%. After addition of 130 parts DGME, the batch is neutralized with 35 milliMoles formic acid/100 g resin solids and diluted by adding deionized water in portions. The solids content of the opaque dispersion is 35%.

EXAMPLE 7

930 parts MAD A as above produced are reacted with 125 parts CE (0.5 moles) at 120° C. to an acid value of 30 mg KOH/g. This product is designated herein as MAD B.

317 parts MAD B are reacted with 219 parts EPH I, in an 80% solution in PME, at 120° C. to an acid value of practically zero. After addition of 146 parts PME, 59 parts DEAPA (0.45 moles) and 29 parts (0.4 moles) NBA the batch is reacted at 65° to 70° C. to an epoxy value of practically zero. After reaching this value, 114 parts BPA (0.5 moles), 21 parts PH (0.2 moles) and 66 parts PF 91 (2.0 moles) are added and the reaction is carried out at 60° C. to a content of free formaldehyde of below 0.5%. After addition of 160 parts PME, the batch is neutralized with 40 milliMoles of formic acid/100 g of resin solids and diluted to 40% solids through addition of deionized water in portions.

Examples 8-13 are directed to the reaction of the epoxy resin-amino adducts using amino-alkylation products of monosubstituted phenols.

Preparation of the Amino-Alkylated Phenols MVP 1-5:

The amine and the phenol are heated to 70° C. in a reaction vessel equipped with receiver, cooler, thermometer, and stirrer. Formaldehyde is added in portions, the temperature which will increase due to the exothermic reaction is not allowed to surpass 80° C. The reaction water is stripped with the aid of an entraining agent with a boiling range of from 80° to 130° C., such as white spirit hydrocarbon. The reaction is carried out until the theoretical quantity of reaction water has been eliminated. After vacuum-stripping the solvent, the product is diluted with DEGM. The composition of each intermediate MVP 1-5 is listed in the following table.

| MVP | 1 | 2 | 3 | 4 | 5 |
|---|---|---|---|---|---|
| DEAPA | 130 | — | — | — | — |
| HMDA | — | 116 | — | — | — |
| EHA | — | — | 129 | — | — |
| HMDA/BUAC | — | — | — | 368 | — |
| HMDA/CE | — | — | — | — | 616 |
| NPH | 440 | 880 | — | 220 | 220 |
| PTB | — | — | 300 | — | — |
| BPA | — | — | — | 228 | 228 |
| PF 91 | 66 | 132 | 66 | 66 | 66 |
| Diluted with DGME (% solids) | 80 | 80 | 80 | 85 | 80 |

Preparation of Additional Epoxy Resin-Amino Adducts A 6–A 8 For Use In Examples 8-13:

Adduct A 6:

700 parts B 180 are reacted in known manner at 200° C. with 100 parts MAA in the presence of 0.05 parts diphenylparaphenylenediamine (inhibitor) until the MAA has reacted completely. After cooling to 100° C., 130 parts EHX are added and esterified at 120° C. until the theoretical acid value of the semiester is attained. This product is designated MAD A. 110 parts MAD A (corresponding to about 0.12 COOH-groups) are reacted with 212 parts EPH I in an 80% solution in DEGM at 120° C. to an acid value of practically zero. After addition of 108 parts DEGM, 59 parts DEAPA (0.45 moles) and 59 parts EHA (0.45 moles), the batch is reacted at 65° to 70° C. to an epoxy value of practically zero.

Adduct A 7:

190 parts EPH I (1 Val) are dissolved in 132 parts DEGM in a reaction vessel equipped with stirrer, thermometer and reflux condensor and heated to 60° C. Then, a blend of 59 parts DEAPA (0.45 moles) and 58 parts EHA (0.45 moles) is slowly added, the reaction temperature being held at 75° to 80° C. with cooling if necessary. The temperature is held until the epoxy value has fallen to practically zero. The adduct solution which is ready for further processing contains, calculated on resin solids, 0.8 moles NH-groups.

Adduct A 8:

475 parts EPH II (1 Val) are dissolved in 254 parts DEGM and reacted at 70°-75° C. with 59 parts DEAPA (0.45 moles) and 58 parts EHA (0.45 moles) to an epoxy value of practically zero. The adduct contains, calculated on resin solids, 0.8 moles NH-groups.

EXAMPLE 8

In a reaction vessel equipped with stirrer, thermometer and reflux condensor, 628 parts Adduct A 6 (corresponding to 0.8 moles NH-groups) are reacted at 60° C. with 114 parts BPA (0.5 moles), 149 parts MVP 1 (80%, 0.2 moles) and 76 parts PF 91 (2.3 moles) until the content of free formaldehyde has fallen to 0.5-1% (calculated on the formaldehyde used). The batch is diluted with 170 parts PME and neutralized with 35 milliMoles of formic acid per 100 g of resin solids. After homogenizing for one hour, 975 parts of deionized water are slowly added while vigorously stirring. The resulting dispersion has a solids content of about 35%.

Products with substantially equal properties are obtained also with Alternative B in the "one-reactor process." In this method, 628 parts Adduct A 6 are blended at 90° C. with 88 parts NPH (0.4 moles), 26 parts DEAPA (0.2 moles), 13 parts PF 91 (0.4 moles), and 30 parts DEGM. The temperature is held for one hour. After addition of 114 parts BPA (0.5 moles) and 76 parts PF 91 (2.3 moles), the temperature is adjusted to 70° C. and held until the content of free formaldehyde has fallen below 0.5%. Further processing is carried out as defined in Example 8.

EXAMPLE 9

As described in Example 6, 439 parts of Adduct A 7 (corresponding to 0.8 moles NH-groups), after addition of 130 parts DEGM at 65° C., are reacted with 91 parts BPA (0.4 moles), 392 parts MVP 2 (80%; 0.3 moles) and 66 parts PF 91 (2 moles), until the content of free formaldehyde has fallen below 0.5%. After addition of 192 parts PME and 35 milliMoles of formic acid per 100 g of resin solids, a 40% dispersion is prepared by slowly adding deionized water.

EXAMPLE 10

As described in Example 6, 439 parts of Adduct A 7 (corresponding to 0.8 moles NH-groups), after addition of 130 parts DEGM, at 65° C., are reacted with 396 parts MVP 3 (80%, 0.7 moles) and 43 parts PF 91 (1.3 moles) until the content of free formaldehyde has fallen to between 0.5 to 1%. After addition of 36 parts PME and 30 milliMoles of formic acid per 100 g of resin solids, a 36% dispersion is prepared by slowly adding deionized water in portions.

EXAMPLE 11

As described in Example 6, 628 parts of Adduct A 6 (corresponding to 0.8 moles of NH-groups) are reacted at 60° C. with 91 parts bisphenol A (0.4 moles), 296 parts MVP 4 (85%; 0.3 moles), and 66 parts PF 91 (2 moles) until the content of free formaldehyde has fallen below 0.5%. After addition of 122 parts PME and 30 milliMoles of formic acid per 100 g of resin solids, a 36% dispersion is formed through slow addition of deionized water.

A final product which is substantially equivalent can be formed from the same components, according to Alternative C, i.e., the "one-reactor process." In this case, 628 parts of Adduct A 6 are diluted with 44 parts DEGM and are reacted at 65° C. after addition of 110 parts HMDA/BUAC, 66 parts NPH (0.3 moles), 159 parts BPA (0.7 moles), and 86 parts PF 91 (2.6 moles) until the content of free formaldehyde has fallen below 0.5%. Further processing is carried out according to the procedure of Example 9.

EXAMPLE 12

As described in Example 6, 846 parts of Adduct A 8 (corresponding to 0.8 moles NH-groups) are reacted at 65° C. after addition of 88 parts DEGM, with 680 parts MVP 5 (80%; 0.5 moles), 68 parts BPA (0.3 moles), and 79 parts PF 91 (2.4 moles) until the content of free formaldehyde has fallen below 0.5% (calculated on the formaldehyde used). After addition of 35 milliMoles formic acid per 100 g of resin solids, a 36% dispersion is prepared by slowly adding deionized water.

EXAMPLE 13

In the apparatus described in Example 8, in the presence of 628 parts Adduct A 6 (containing 0.8 moles NH-groups), 23 parts HMDA are reacted at 70° to 75° C. with 51 parts BUAC for one hour. After addition of 160 parts BPA (0.7 moles), 44 parts NPH (0.2 moles), and 33 parts PF 91 (1 mole, corresponding to 31 mole-%, calculated on the formaldehyde-reactive sites), the batch is held at 60° to 65° C. until the content of free formaldehyde has fallen to practically zero. A 40% dispersion is prepared by addition of 40 milliMoles formic acid per 100 g of resin solids.

Examples 14 and 15 describe the partial replacement of the phenols by urea and melamine.

EXAMPLE 14

1064 parts (5.6 Val) EPH I are dissolved with 694 parts DPME in a reaction vessel equipped with thermometer, stirrer and reflux condenser, and are reacted at 65° to 70° C. With 116 parts HMDA (1 mole), 364 parts DEAPA (2.8 moles), and 103 parts EHA (0.8 moles) until the epoxy value is zero. The adduct contains 5.6 moles of secondary NH-groups. After addition of a further 180 parts DPME, 550 parts NPH (2.5 moles), 84 parts of a 50% aqueous solution of urea (corresponding to 0.7 moles urea), 251 parts BPA (1.1 moles), and 254 parts PF 91 (7.7 moles) are added and the batch is stirred at 60° C. until the content of free formaldehyde (calculated on the formaldehyde used) has fallen below 1%.

The batch is neutralized with 272 parts of N-3 formic acid (corresponding to 30 milliMoles/100 g resin solids) and slowly diluted with deionized water to a solids content of 40% to provide a dispersion.

EXAMPLE 15

In the apparatus described in Example 14, 760 parts EPH I (4.0 Val) are dissolved in 490 parts DPME and reacted at 65° to 70° C. with 116 parts HMDA (1 mole), and 260 parts DEAPA (2 moles) until the epoxy value is zero. The adduct contains four moles of secondary amino groups. After addition of a further 350 parts DPME, 594 parts NPH (2.7 moles) and 63 parts melamine (0.5 moles) are added, and the batch is stirred at 55° to 60° C. until the content of free formaldehyde has fallen to below 1% (calculated on the formaldehyde used). After addition of 161 parts (corresponding to 25 milliMoles/100 g resin solids) of an N-3 formic acid, a 35% dispersion is made according to the method described in Example 1.

Evaluation of the Binders Prepared According to the Invention:

Low solvent dispersions are prepared from the products of the invention as described. The necessary quantity of acid, the degree of neutralization, the solids content of the dispersions, and losses on stoving are summarized in Table II.

TABLE II

| Example | milliMoles Acid/100 g Resin Solids* | Neutralization % | Solids Content of Dispersion | Losses on Stoving % at °C.** |
|---|---|---|---|---|
| 1 | 50 | 20.7 | 38 | 3.2/160 |
| 2 | 55 | 33.1 | 47 | 2.8/150 |
| 3 | 20 | 9.8 | 40 | 5.6/180 |
| 4 | 40 | 11.0 | 35 | 2.5/140 |
| 5 | 60 | 16.9 | 36 | 4.3/180 |
| 6 | 35 | 15.9 | 35 | 4.2/160 |
| 7 | 40 | 18.4 | 40 | 7.8/170 |
| 8 | 35 | 14.8 | 35 | 4.8/150 |
| 9 | 35 | 13.8 | 40 | 7.1/170 |
| 10 | 30 | 9.7 | 36 | 9.8/180 |
| 11 | 30 | 13.0 | 36 | 4.3/160 |
| 12 | 35 | 19.2 | 36 | 5.2/170 |
| 13 | 40 | 17.9 | 40 | 8.9/160 |
| 14 | 30 | 9.7 | 40 | 8.3/170 |

TABLE II-continued

| Example | milliMoles Acid/100 g Resin Solids* | Neutral- ization % | Solids Content of Dispersion | Losses on Stoving % at °C.** |
|---|---|---|---|---|
| 15 | 25 | 8.1 | 35 | 11.7/180 |

*formic acid (or acetic acid)
**For determining the losses on stoving, the dispersion is diluted with deionized water to a solids content of 10%. Degreased steel panels are cathodically coated under conditions to give films with a dry film thickness of 18 ± 2 μm. The panels are pre-dried at 110° C. for 30 minutes, weighed, and stoved for another 30 minutes at the listed temperatures. The losses on stoving are determined by weighing back the panels. The listed stoving temperatures guarantee satisfactory crosslinking which is characterized by a resistance to solubilization of a double-rub with a cotton pad soaked with methyl-isobutyl-ketone of more than 100 times. Analogous stoving conditions were applied for testing the resistance characteristics.

For determining the resistance characteristics of Examples 1 to 7, 14 and 15, pigmented paints according to the following formulations were prepared. Paints formulated on Examples 8 to 13 do not contain high boiling solvents (coalescing agents). Nevertheless, the surfaces were satisfactory in all cases.

| Binder of Example | 1 | 2 | 3 | 4 | 5 |
|---|---|---|---|---|---|
| Milling Paste(1) (I) | 83 | — | 83 | 83 | — |
| Milling Paste (II) | — | 91 | — | — | 91 |
| Binder of Invention (Dispersion) | 197 | 149 | 188 | 214 | 208 |
| Coalescing Agent | 12 TEX | 10 TEX | — | 8 HEGL | 14 TEX |
| Water | 486 | 528 | 507 | 473 | 465 |
| Mill Base Resin/ Dispersion (solids/solids) | 25/75 | 30/70 | 25/75 | 25/75 | 30/70 |

| Binder of Example | 6 | 7 | 8 | 9 | 10 |
|---|---|---|---|---|---|
| Milling Paste(1) (I) | 83 | 83 | — | 83 | 83 |
| Milling Paste (II) | — | — | 91 | — | — |
| Binder of Invention (Dispersion) | 214 | 188 | 200 | 188 | 208 |
| Coalescing Agent | — | — | — | — | — |
| Water | 481 | 507 | 487 | 507 | 487 |
| Mill Base Resin/ Dispersion (solids/solids) | 25/75 | 25/75 | 30/70 | 25/75 | 25/75 |

| Binder of Example | 11 | 12 | 13 | 14 | 15 |
|---|---|---|---|---|---|
| Milling Paste(1) (I) | 83 | — | — | 83 | 83 |
| Milling Paste (II) | — | 91 | 91 | — | — |
| Binder of Invention (Dispersion) | 208 | 194 | 188 | 188 | 214 |
| Coalescing Agent | — | — | — | — | — |
| Water | 487 | 493 | 499 | 507 | 481 |
| Mill Base Resin/ Dispersion (solids/solids) | 25/75 | 30/70 | 30/70 | 25/75 | 25/75 |

(1)The milling paste is based on a mill base resin which is an oxazolidine-modified epoxy resin.

| Milling Paste | | |
|---|---|---|
| (I) | (II) | |
| 100 parts | 100 parts | Mill Base Resin (100%) |
| 1 | 0.8 | Carbon Black |
| 12 | 10 | Basic Lead Silicate |
| 147 | 122.5 | Titanium Dioxide |

The mill base resin is prepared in the following manner:

500 parts of an epoxy resin based on bisphenol A (epoxy equivalent weight about 500) are dissolved in 214 parts PME and reacted at 110° C. with 83 parts of a semiester of phthalic anhydride and EHX in the presence of 0.5 g triethylamine as catalyst to an acid value of below 3 mg KOH/g. Then 120 parts of an NH-functional oxazolidine of aminoethylethanolamine, 2-ethylhexylacrylate and formaldehyde, and 26 parts DEAPA are added and the batch is reacted at 80° C. to an epoxy value of practically zero. The batch is diluted with 200 parts propyleneglycolmonoethylether and is partially neutralized with 97 parts N-3 formic acid. The resulting solids content of the solution is 58.8%.

After dilution to a solids content of 18%, the paints are cathodically deposited on zinc-phosphated steel panels under conditions to give films with a dry film thickness of 20±2 μm and stoved for 30 minutes at the same temperatures as used for determining the stoving losses. In all cases, the salt spray test ASTM B 117-64, after 700 hours of exposure, showed rusting of less than 2 mm at the crosshatch. In the humidity chamber (100% relative humidity at 50° C.), the coatings are in good condition after 500 hours.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cathodically depositable electrodeposition paint binders based on modified epoxy resins characterized in that an epoxy resin with at least two epoxy groups and having an epoxy equivalent weight of from about 180 to 1000 is reacted at from about 50° to 120° C. with 0.6 to 1.0 moles of primary amino groups on a primary monoalkyl amine or a primary alkylene diamine or a primary-tertiary alkylene diamine per each available epoxy group and 0 to 0.4 moles of a carboxylic compound or a secondary amine per each available epoxy group to provide an epoxy resin-amino adduct having an epoxy value of substantially zero, said epoxy resin-amino adduct thereafter being reacted at from about 50° to 90° C., calculated on one mole of NH-groups, with 0.5 to 1.0 moles phenol, and with 0.25 to 0.9 moles of formaldehyde per formaldehyde-reactive site, until the formaldehyde is substantially bound and the reaction product, upon partial or total neutralization with acids, is dilutable with water.

2. The process according to claim 1 wherein the said phenol is a mono- or polynuclear phenol.

3. The process according to claim 2 wherein said mono- or polynuclear phenol is substituted with an alkyl group.

4. The process according to claim 2 wherein the amine is a primary monoalkylamine with at least four carbon atoms.

5. The process according to claim 1 wherein said phenol is an amino-alkylation product of a monosubstituted or dinuclear phenol.

6. The process according to claim 1 wherein a portion of said phenol is substituted with a formaldehyde-reactive compound.

7. The process according to claim 6 wherein said formaldehyde-reactive compound is urea, melamine, or guanamine.

8. The process according to claim 7 wherein the carboxylic compound is a monocarboxylic acid which has from 7 to 20 carbon atoms.

9. The process according to claim 7 wherein the carboxylic compound is a semiester of a dicarboxylic acid with monoalcohols or an oxazolidine compound.

10. The process according to claim 1 wherein the epoxy resin is based on bisphenol A or a phenol novolak.

11. The process according to claim 1 wherein the amine is a blend of primary monoalkylamines and primary alkylene diamines.

12. The process according to claim 1 wherein the reaction of the epoxy groups with the amines is carried out at 50° to 90° C.

13. The process according to claim 1 wherein the reaction of the epoxy groups with the carboxylic compounds is carried out at from 90° to 120° C.

14. The process according to claim 13 wherein the carboxylic compound is an addition product of maleic acid anhydride to an unsaturated oil or the hydroxy-free esters of an oil fatty acid with a polyol or a low molecular unsaturated hydrocarbon polymer or oligomer, the anhydride groups of maleic acid having been opened through semiester formation with a monohydroxy compound.

15. The process according to claim 14 wherein the carboxylic compounds have an acid value of from 30 to 130 mg KOH/g.

16. The process according to claim 15 wherein the number of carboxy groups of the semiesters is reduced through reaction with monoepoxy compounds.

17. The process according to claim 1 wherein an auxiliary organic solvent is utilized in the process and, after neutralization with acids and dilution with water, the solvent is at least partly vacuum-stripped from the reaction product at from 30° to 60° C.

18. Cathodically depositable electrodeposition paint binders based on modified epoxy resins comprising the reaction product at from about 50° to 120° C. of an epoxy resin with at least two epoxy groups and an epoxy equivalent weight of from about 180 to 1000 with 0.6 to 1.0 moles of primary amino groups on a primary monoalkyl or a primary alkylene diamine or a primary-tertiary alkylene diamine per each available epoxy group and 0 to 0.4 moles of a carboxylic compound or a secondary amine per each available epoxy group to provide an epoxy resin-amino adduct having an epoxy value of substantially zero, said epoxy resin-amino adduct thereafter reacted at from about 50° to 90° C. per mole of NH-groups, with 0.5 to 1.0 moles of a phenol and 0.25 to 0.9 moles of formaldehyde per formaldehyde-reactive site to provide a product wherein said formaldehyde is substantially bound and said reaction product, upon partial or total neutralization with acids, is dilutable with water.

19. The binder according to claim 18 wherein the said phenol is a mono- or polynuclear phenol.

20. The binder according to claim 19 wherein said mono- or polynuclear phenol is substituted with an alkyl group.

21. The binder according to claim 19 wherein the amine is a primary monoalkylamine with at least four carbon atoms.

22. The binder according to claim 18 wherein said phenol is an amino-alkylation product of a monosubstituted or dinuclear phenol.

23. The binder according to claim 18 wherein a portion of said phenol is substituted with a formaldehyde-reactive compound.

24. The binder according to claim 18 wherein the epoxy resin is based on bisphenol A or a phenol novolak.

25. The binder according to claim 18 wherein the amine is a blend of primary monoalkylamines and primary alkylene diamines.

26. The binder according to claim 18 wherein the carboxylic compound is a monocarboxylic acid which has from 7 to 20 carbon atoms.

27. The binder according to claim 26 wherein the carboxylic compound is an addition product of maleic acid anhydride to an unsaturated oil or the hydroxy-free esters of an oil fatty acid with a polyol or a low molecular unsaturated hydrocarbon polymer or oligomer, the anhydride groups of maleic acid having been opened through semiester formation with a monohydroxy compound.

* * * * *